(12) United States Patent
Quigley et al.

(10) Patent No.: US 12,052,371 B2
(45) Date of Patent: Jul. 30, 2024

(54) METHOD FOR MONITORING A NETWORK (71) Applicant: Warwick Control Technologies Limited, Warwick (GB)

(72) Inventors: Christopher Patrick Quigley, Birmingham (GB); David Stewart Roy Charles, Warwick (GB)

(73) Assignee: WARWICK CONTROL TECHNOLOGIES LIMITED, Warwick (GB)

( * ) Notice: Subject to any disclaimer, the term of this patent is extended or adjusted under 35 U.S.C. 154(b) by 612 days.

(21) Appl. No.: 17/197,849

(22) Filed: Mar. 10, 2021

(65) Prior Publication Data

US 2022/0294638 A1 Sep. 15, 2022
US 2023/0299967 A9 Sep. 21, 2023

(30) Foreign Application Priority Data

Mar. 12, 2020 (GB) ..................................... 2003599

(51) Int. Cl.
| | |
|---|---|
| H04L 9/32 | (2006.01) |
| G06F 18/2135 | (2023.01) |
| G06F 18/22 | (2023.01) |
| H04L 9/30 | (2006.01) |
| H04L 12/40 | (2006.01) |
| H04L 43/0817 | (2022.01) |

(52) U.S. Cl.
CPC ...... *H04L 9/3242* (2013.01); *G06F 18/21355* (2023.01); *G06F 18/22* (2023.01); *H04L 9/3066* (2013.01); *H04L 12/40013* (2013.01); *H04L 43/0817* (2013.01); *H04L 2012/40215* (2013.01); *H04L 2012/40273* (2013.01); *H04L 2209/84* (2013.01)

(58) Field of Classification Search
CPC ... G06F 18/21355; G06F 18/22; H04L 12/40; H04L 12/40013; H04L 2012/40215; H04L 2012/40273; H04L 2209/84; H04L 25/0272; H04L 43/0817; H04L 9/3066; H04L 9/3242
See application file for complete search history.

(56) References Cited

U.S. PATENT DOCUMENTS 10,124,764 B1 * 11/2018 Ahmed ................ B60R 16/023
2005/0088855 A1 * 4/2005 Kirchmeier ....... H02M 7/53871
363/17

(Continued)

OTHER PUBLICATIONS

Great Britain Search Report for GB Application No. GB2003599.4 dated Dec. 9, 2020, 3 pages.

(Continued)

*Primary Examiner* — Gary S Gracia
(74) *Attorney, Agent, or Firm* — DAY PITNEY LLP; George N. Chaclas; Anthony A. Kassas (57) ABSTRACT

A method for monitoring operation of a controller area network (CAN) comprising a plurality of nodes. The method comprises measuring a voltage associated with a CAN message transmitted on the network, determining a message signature in dependence on the measured voltage, and comparing the message signature with a node signature to determine the authenticity of the CAN message. One or more actions may be taken in dependence on the determined authenticity.

25 Claims, 7 Drawing Sheets

(56) References Cited

U.S. PATENT DOCUMENTS

| | | | | |
|---|---|---|---|---|
| 2015/0185262 | A1* | 7/2015 | Song | G06N 20/10 |
| | | | | 702/64 |
| 2017/0322534 | A1* | 11/2017 | Sinha | G06Q 50/163 |
| 2018/0091550 | A1* | 3/2018 | Cho | H04L 5/0055 |
| 2018/0270196 | A1* | 9/2018 | Bathurst | H04L 12/40032 |
| 2018/0337934 | A1* | 11/2018 | Huth | H04L 63/1425 |
| 2019/0020499 | A1* | 1/2019 | Meier | H03M 13/09 |
| 2019/0026103 | A1* | 1/2019 | Van Der Maas | G06F 11/0784 |
| 2019/0028500 | A1* | 1/2019 | Lee | H04L 12/40032 |
| 2019/0245872 | A1* | 8/2019 | Shin | H04L 12/40 |
| 2021/0013884 | A1* | 1/2021 | Yano | H04L 25/02 |
| 2022/0294638 | A1* | 9/2022 | Quigley | H04L 12/40 |

OTHER PUBLICATIONS

Christopher Quigley, et al.; SAE International; Technical Paper 2019-01-0476, Published Apr. 2, 2019, 6 pages.

Warwick Control Technologies; www.warwickcontrol.com; website article entitled, The use of CAN bus message electrical signatures for automotive reverse engineering; published Jul. 4, 2018, 13 pages.

* cited by examiner

METHOD FOR MONITORING A NETWORK

CROSS-REFERENCE TO RELATED APPLICATION

This application claims priority to and the benefit of Great Britain Patent Application No. GB2003599.4, filed Mar. 12, 2020, which is incorporated herein by reference.

TECHNICAL FIELD

The present technology relates to a method for monitoring a network, and in particular a method for monitoring a controller area network (CAN). The subject technology extends to a control system for a network, a network and a system comprising the network.

BACKGROUND

A control network typically comprises a number of devices or electronic control units (ECUs), which may collectively be referred to as "nodes". Each of these nodes may be responsible for controlling operation of part of a complete system either directly or under instruction from a central control unit. For instance, a control network may be provided in a vehicle with individual nodes or control units including an engine management controller, a HVAC control module, body electronics module, infotainment controller etc. Control networks are not limited to vehicles, and have applications in, for example, building management systems and manufacturing processes, amongst many other things.

Such control networks are vulnerable to "attacks" where access to the network may be obtained illegitimately and then used to control the overall system. Such attacks may take the form of a rogue device being physically connected to a network. The rogue device may act to mimic a genuine node of the network, or otherwise control nodes of the network in order to control the overall system. Attacks may also take the form of remote control over one or more genuine nodes of the system and causing those genuine nodes to operate incorrectly—e.g. by causing those nodes to send messages on the network with incorrect identifiers, acting as if those inauthentic messages were sent by a different node on the network.

Some prior art solutions are known which are able to detect whether there is an attack or not. For example, some prior art systems are known which are operable to detect the introduction of another node onto the network and determine an attack on this basis. However, most known solutions are unable to identify which, if any, node has been compromised and take appropriate action. Hence, known solutions tend to require complete shutdown of the network once an attack has been identified. This can result in the overall system being inoperable which is inconvenient at best where the system is a vehicle, and potentially very costly where the system forms part of, for example, a manufacturing process. It would therefore be advantageous to be able to isolate a particular node at the centre of an attack and take appropriate local action as this may allow for the overall system to continue to operate, either unaffected or in a limited capability mode, whilst the affected node is addressed.

Known solutions which look to identify particular compromised nodes fail adequately address these problems. For instance, one known solution (US2019/0245872A1) makes use of voltage discrepancies between signals originating from different nodes on a controller area network, and attempts to use such discrepancies to discriminate between different nodes. However, this solution introduces further drawbacks in that whilst any given message on the network may differ in its voltage level depending on its origin, those differences are relatively minor and are masked by competing signals on the network, for instance during arbitration and acknowledgement of the message. No complete solution has been provided which overcomes these issues.

It would therefore be advantageous to provide an improved means of monitoring operation of a network to determine the authenticity of messages being sent over a network.

It is an aim of an embodiment or embodiments of the subject technology to overcome or at least partially mitigate one or more problems with the prior art.

SUMMARY

According to an aspect of the subject technology there is provided a method for monitoring operation of a network comprising a plurality of nodes, the method comprising: measuring a voltage associated with a message transmitted on the network, the measurements being obtained for a data field of the message, only; determining a message signature in dependence on the measured voltage, the message signature comprising a voltage characteristic associated with the measured voltage; comparing the message signature with a node signature, the node signature comprising an expected voltage characteristic determined in dependence on one or more previously measured messages on the network; and determining the authenticity of the message in dependence on the comparison.

According to an aspect of the subject technology there is provided a method for monitoring operation of a controller area network (CAN) comprising a plurality of nodes, the method comprising: measuring the voltage associated with a CAN High (CANH) signal and a CAN Low (CANL) signal of a CAN message transmitted on the network from a node, the measurements being obtained for the data field of the CAN message, only; determining a message signature in dependence on the measured voltages, the message signature comprising a first voltage characteristic corresponding to the voltage associated with the CANH signal and a second voltage characteristic corresponding to the voltage associated with CANL signal during transmission of the data field of the CAN message; comparing the message signature with a node signature for the node, the node signature comprising expected first and second voltage characteristics for the CANH and CANL signals, respectively, the expected first and second voltage characteristics being determined in dependence on one or more previously measured CAN messages on the network; and determining the authenticity of the CAN message in dependence on a difference between the first and second voltage characteristics of the message signature and the expected first and second voltage characteristics of the node signature.

Advantageously, the present technology makes use of the fact that the setup of the network inherently leads to minor differences in the voltage levels of the CANH and CANL signals between different nodes. For instance, the CANH and CANL signals may be influenced by factors including different component characteristics associated with each node, the position of each node within the network, the length of the CAN bus, etc. Using this, the present technology is able to determine whether a monitored signal from a node is authentic—i.e. is a genuine signal within the context of the normal operation of the network, and is not related, for example, due to malicious access or attempts to control the network. This is achieved by checking that the voltage characteristics for the CANH and CANL signals are as expected for a CAN message identifying as originating from a particular node. By measuring the voltage associated with the CAN message only for the data field, and specifically by ignoring the arbitration field and acknowledgement fields for voltage measurement purposes (although the arbitration field may be used for ID purposes) where multiple nodes may be accessing (or attempting to access) the network, this ensures that only the CANH and CANL signals for a single node are being measured which might otherwise lead to an inaccurate determination of the voltage characteristic(s) for the CAN message.

Optional features set out below may apply to any aspect of the subject technology.

The subject technology is described here with reference to a controller area network (CAN). However, and as set out in one or more preceding aspects of the subject technology, the subject technology is not limited in this sense. Rather, the subject technology is applicable to any network type based on differential signalling. The subject technology advantageously identifies and isolates parts of the message frame which correspond to only a single node transmitting data—for CAN, this corresponds primarily to the data field.

The method may comprise measuring the voltage associated with CANH and CANL signals for at least a portion of the data field of the CAN message. The method may comprise measuring the voltage associated with the CANH and CANL signals for substantially the whole data field of the CAN message.

The method may comprise measuring the voltage associated with CANH and CANL signals for a measurement time period. The measurement time period may be dependent on the length of the data field of the CAN message. The measurement time period may be dependent on the speed of the network. The measurement time period may be dependent on the data length code (DLC) of the CAN message. The method may comprise determining the measurement time period. Advantageously, measuring the voltage associated with the CANH and CANL signals for the measurement time period may ensure that no voltage measurements are taken during bits/fields following the data field, and in particular no voltage measurements are taken during the acknowledgement fields of the CAN message.

The method may comprise identifying a start-of-frame (SOF) field of the CAN message. The method may comprise using the SOF field to trigger the measurement of the voltage associated with the CANH and CANL signals of the CAN message. The method may comprise delaying measurement of the CANH and CANL voltage for a delay period. The delay period may be dependent on the speed of the network. The delay period may be dependent on the network configuration. For example, the delay period may be dependent on the length (e.g. the number of bits) of the CAN message preceding the data field. The number of bits preceding the data field for a CAN message may differ between different CAN types, e.g. between CAN 2.0A (which may include 11 identifier bits) and CAN 2.0B (which may include 29 identifier bits). The delay period may also be dependent on a buffer. The buffer may account for possible bit stuffing, for example, prior to the data field. The buffer may comprise a multiplication factor applied to the length of the CAN message preceding the data field. The method may comprise determining the delay period. Advantageously, the method may ensure that no voltage measurements are taken prior to the data field, an in particular no voltage measurements are taken during the arbitration field.

The method may comprise obtaining multiple voltage measurements for both the CANH and CANL signals. The first voltage characteristic may comprise an average voltage for the CANH signal. The second voltage characteristic may comprise an average voltage for the CANL signal.

The method may comprise determining whether each of the voltage measurements corresponds to a dominant or recessive bit. This may comprise determining a voltage difference between the CANH and CANL signals for voltage measurements obtained at the same time. For example, in some embodiments the method may comprise subtracting the CANL voltage from the CANH voltage. The difference may be compared to a threshold. The method may comprise determining that a voltage measurement corresponds a dominant bit in dependence on the difference being greater than the threshold, and determining that a voltage measurement corresponds to a recessive bit in dependence on the difference being less than the threshold. The threshold may, for example, be 1V. Advantageously, using the difference between CANL and CANH voltages to discriminate between dominant and recessive bits may account for networks with poor ground characteristics which might lead to inaccuracies were absolute voltage values used.

The method may comprise discarding voltage measurements corresponding to recessive bits. For example, the first voltage characteristic may comprise a voltage associated with one or more dominant bits of the CANH signal. The first voltage characteristic may comprise an average voltage associated with a plurality of dominant bits of the CANH signal. Equally, the second voltage characteristic may comprise a voltage associated with one or more dominant bits of the CANL signal. The second voltage characteristic may comprise an average voltage associated with a plurality of dominant bits of the CANL signal.

In an alternative embodiment, the method may comprise discarding voltage measurements corresponding to dominant bits. For example, the first voltage characteristic may comprise a voltage associated with one or more recessive bits of the CANH signal. The first voltage characteristic may comprise an average voltage associated with a plurality of recessive bits of the CANH signal. Equally, the second voltage characteristic may comprise a voltage associated with one or more recessive bits of the CANL signal. The second voltage characteristic may comprise an average voltage associated with a plurality of recessive bits of the CANL signal.

In a further embodiment the method may comprise determining a message signature which comprises four voltage characteristics. The four voltage characteristics may include a first voltage characteristic corresponding to the voltage associated with dominant bits of the CANH signal, a second voltage characteristic corresponding to the voltage associated with recessive bits of the CANH signal, a third voltage characteristic corresponding to the voltage associated with dominant bits of the CANL signal, and a fourth voltage characteristic corresponding to the voltage associated with recessive bits of the CANL signal. One or more of the first, second, third and fourth voltage characteristics may comprise an average voltage value obtained from a plurality of voltage measurements obtained for the data field of the CAN message.

The node signature comprises expected first and second voltage characteristics for the CANH and CANL signals. The expected first and second voltage characteristics are determined in dependence on one or more previously measured CAN messages on the network. For example, in some embodiments the node signature may be determined based on a plurality of message signatures determined based on voltage measurements of a plurality of CAN messages on the network, e.g. in the same way as the message signature of the measured CAN message described herein. The previous CAN messages on the network may comprise control messages which are known to be authentic. The node signature(s) may be assigned to one or nodes based on knowledge of the network.

The expected first and second voltage characteristics of a node signature may be determined in dependence on a plurality of message signatures of previously measured CAN messages on the network. For instance, the expected first voltage characteristic may comprise an average voltage characteristic of first voltage characteristics of a plurality of earlier CAN messages. In further embodiments, the expected first voltage characteristic may be indicative of a statistical distribution of first voltage characteristics of a plurality of earlier CAN messages. Similarly, the expected second voltage characteristic may comprise an average voltage characteristic of second voltage characteristics of a plurality of earlier CAN messages, or may be indicative of a statistical distribution of second voltage characteristics of a plurality of earlier CAN messages.

The expected first and second voltage characteristics may be determined during an installation phase of the network. The expected first and second voltage characteristics may be updated, in use, e.g. upon measurement and validation of an authentic CAN message.

The node signature(s) may be stored in a memory accessible by the network. The method may comprise any one or more of generating, storing and/or retrieving the node signature(s).

The message signature may comprise a third voltage characteristic indicative of a voltage difference between the CANH and CANL signals of the CAN message. The node signature may comprise a corresponding expected third voltage characteristic. The method may comprise determining the authenticity of the CAN message in dependence on a difference between the first, second and third voltage characteristics of the message signature and the expected first, second and third voltage characteristics of the node signature.

The method comprises determining the authenticity of the CAN message. In embodiments, this comprises comparing the message signature with the node signature, and determining the authenticity of the CAN message in dependence on a difference between the first and second voltage characteristics of the message signature and the expected first and second voltage characteristics of the node signature. The comparison may comprise determining whether the first and/or second voltage characteristics of the message signature is/are within a threshold difference from the corresponding expected first and/or second voltage characteristics. If the first and/or second voltage characteristics are outside of the threshold difference, the method may comprise determining that the CAN message is inauthentic.

The difference between the first voltage characteristic and the expected first voltage characteristic, and/or the difference between the second voltage characteristic and the expected second voltage characteristic may be determined as a distance (e.g. in parameter space). For example, the method may comprise determining a Euclidean distance between the voltage characteristics of the message signature and the expected voltage characteristics of the node signature. The determined distance may be compared with a threshold, and the method may comprise determining an authenticity of the CAN message in dependence on said comparison. For example, the CAN message may be determined to be authentic in dependence on the determined distance being less than the threshold, and may be determined to be inauthentic in dependence on the determined distance being greater than the threshold.

The method may comprise characterising a CAN message once determined to be inauthentic. The characterisation may relate to the possible cause of the inauthentic CAN message. For example, in some embodiments the method may comprise comparing the message signature for a particular CAN message with a plurality of node signatures, each relating to different nodes on the network. The method may comprise determining the origin of the CAN message in dependence on this comparison. For instance, if the CAN message is determined to be inauthentic—e.g. lie outside of a threshold difference or distance from the expected node signature for that message—but be identified as "authentic" with respect to another node signature—e.g. lie within a threshold difference or distance for the other node signature—it may be determined that the possible cause for the inauthentic CAN message is erroneous or possibly malicious control of a node of the network. If the CAN message is determined to be inauthentic for the expected node signature, and lies outside of any threshold difference or distance for all other node signatures, it may be determined that the possible cause for the inauthentic CAN message is an inauthentic node which has been later introduced to the network—e.g. an "attacker" connecting a inauthentic ECU to the network in an attempt to gain control of the network.

The method may comprise use of a reference node operable to provide a reference CAN message on the network. The reference node may be a "trusted" node, that is a node which is known to be authentic. The method may comprise determining a message signature for the reference CAN message, or indeed a node signature for the reference node in dependence on a plurality of reference CAN messages. The method may comprise determining the message signature(s) and/or node signature(s) for other CAN messages originating from other nodes of the network relative to the message/node signature associated with the reference node. For example, the first and/or second voltage characteristics of a given message signature may comprise a relative voltage value, the relative voltage value being determined relative to the corresponding first and second voltage characteristics associated with the reference node—e.g. as part of a determined node signature for the reference node. The relative voltage characteristics may be determined as a vector, containing data indicative of the distance and direction of the message signature with respect to the message/node signature associated with the reference node. Advantageously, the method may be used to monitor drift or other changes in the voltage characteristics of the network over time.

The method may comprise controlling operation of the network in dependence on the determined authenticity of the CAN message. For example, where a CAN message is deemed to be authentic the method may comprise taking no action and allowing the network to continue to operate. Where a CAN message is deemed to be inauthentic, the method may comprise preventing access for the associated node to the network. The method may comprise stopping operation of the network altogether. The method may comprise alerting a user/operator of the network to the inauthentic signal.

One or more of the nodes may comprise an electronic control unit (ECU). The network may comprise a controller area network flexible data-rate (CAN FD) network or a CAN XL network.

According to an aspect of the subject technology there is provided a control system for monitoring operation of a network, the control system comprising one or more controllers, and being configured to: receive an input signal indicative of a measured voltage associated with a message transmitted on the network, the measurements being obtained for a data field of the message, only; determine a message signature in dependence on the measured voltage, the message signature comprising a voltage characteristic associated with the measured voltage; compare the message signature with a node signature, the node signature comprising an expected voltage characteristic determined in dependence on one or more previously measured messages on the network; and determine the authenticity of the message in dependence on the comparison.

According to an aspect of the subject technology there is provided a control system for monitoring operation of a controller area network, the control system comprising one or more controllers, and being configured to: receive an input signal indicative of a measured voltage associated with a CANH signal and CANL signal of a CAN message transmitted on the network from a node, the measurements being obtained for the data field of the CAN message, only; determine a message signature in dependence on the measured voltages, the message signature comprising a first voltage characteristic corresponding to the voltage associated with the CANH signal and a second voltage characteristic corresponding to the voltage associated with CANL signal during transmission of the data field of the CAN message; compare the message signature with a node signature for the node, the node signature comprising expected first and second voltage characteristics for the CANH and CANL signals, respectively, the expected first and second voltage characteristics being determined in dependence on one or more previously measured CAN messages on the network; and determine the authenticity of the CAN message in dependence on a difference between the first and second voltage characteristics of the message signature and the expected first and second voltage characteristics of the node signature.

In embodiments, the one or more controllers the one or more controllers collectively comprise: at least one electronic processor having an electrical input for receiving the input signal. The one or more controllers may collectively comprise at least one electronic memory device electrically coupled to the at least one electronic processor and having instructions stored therein. The at least one electronic processor may be configured to access the at least one memory device and execute the instructions thereon so as to compare the message and node signatures and determine the authenticity of the CAN message therefrom.

The voltage measurements may relate to the voltage associated with CANH and CANL signals for at least a portion of the data field of the CAN message. The voltage measurements may relate to the voltage associated with the CANH and CANL signals for substantially the whole data field of the CAN message.

The control system may be operable, e.g. through output of one or more control signals, to control the timing of the voltage measurements.

The voltage measurements may relate to the voltage associated with CANH and CANL signals for a measurement time period. The measurement time period may be dependent on the length of the data field of the CAN message. The measurement time period may be dependent on the speed of the network. The measurement time period may be dependent on the data length code (DLC) of the CAN message. The control system may be operable to determine the measurement time period.

The control system may be operable to identify a start-of-frame (SOF) field of the CAN message. The control system may be configured to use the SOF field to trigger the measurement of the voltage associated with the CANH and CANL signals of the CAN message. For instance, the control system may be operable to receive the CAN message, identify the SOF field from the received CAN message and trigger the voltage measurements in dependence thereon, e.g. by outputting one or more control signals to one or more meters associated with CANH and CANL wires of the network.

The control system may be configured to determine a delay period between the SOF field of the CAN message and the triggering of the voltage measurements. The delay period may be dependent on the speed of the network. The delay period may be dependent on the network configuration. For example, the delay period may be dependent on the length (e.g. the number of bits) of the CAN message preceding the data field. The number of bits preceding the data field for a CAN message may differ between different CAN types, e.g. between CAN 2.0A (which may include 11 identifier bits) and CAN 2.0B (which may include 29 identifier bits). The delay period may also be dependent on a buffer. The buffer may account for possible bit stuffing, for example, prior to the data field. The buffer may comprise a multiplication factor applied to the length of the CAN message preceding the data field.

The control system may be operable to determine the first and/or second voltage characteristics from multiple voltage measurements for both the CANH and CANL signals. The first voltage characteristic may comprise an average voltage for the CANH signal. The second voltage characteristic may comprise an average voltage for the CANL signal.

The control system may be operable to determine whether each of the voltage measurements corresponds to a dominant or recessive bit. This may comprise determining a voltage difference between the CANH and CANL signals for voltage measurements obtained at the same time. For example, the control system may be operable to subtract the CANL voltage from the CANH voltage. The difference may be compared to a threshold. A voltage measurement may be determined to correspond to a dominant bit in dependence on the difference being greater than the threshold, and be determined to correspond to a recessive bit in dependence on the difference being less than the threshold. The threshold may, for example, be 1V.

Voltage measurements corresponding to recessive bits may be discarded by the control system. For example, the control system may be operable to determine the first voltage characteristic as a voltage associated with one or more dominant bits of the CANH signal. The control system may be operable to determine the first voltage characteristic as an average voltage associated with a plurality of dominant bits of the CANH signal. Equally, the control system may be operable to determine the second voltage characteristic as a voltage associated with one or more dominant bits of the CANL signal. The control system may be operable to determine the second voltage characteristic as an average voltage associated with a plurality of dominant bits of the CANL signal.

In an alternative embodiment, the voltage measurements corresponding to dominant bits may be discarded by the control system. For example, the control system may be operable to determine the first voltage characteristic as a voltage associated with one or more recessive bits of the CANH signal. The control system may be operable to determine the first voltage characteristic as an average voltage associated with a plurality of recessive bits of the CANH signal. Equally, the control system may be operable to determine the second voltage characteristic as a voltage associated with one or more recessive bits of the CANL signal. The control system may be operable to determine the second voltage characteristic as an average voltage associated with a plurality of recessive bits of the CANL signal.

In a further embodiment the control system may be operable to determine a message signature which comprises four voltage characteristics. The four voltage characteristics may include a first voltage characteristic corresponding to the voltage associated with dominant bits of the CANH signal, a second voltage characteristic corresponding to the voltage associated with recessive bits of the CANH signal, a third voltage characteristic corresponding to the voltage associated with dominant bits of the CANL signal, and a fourth voltage characteristic corresponding to the voltage associated with recessive bits of the CANL signal. One or more of the first, second, third and fourth voltage characteristics may comprise an average voltage value obtained from a plurality of voltage measurements obtained for the data field of the CAN message.

The control system may be operable to determine the node signature. The control system may be operable may be operable to determine node signatures for each of the plurality of nodes in the network.

The node signature comprises expected first and second voltage characteristics for the CANH and CANL signals. The expected first and second voltage characteristics are determined in dependence on one or more previously measured CAN messages on the network. For example, in some embodiments the control system may be operable to determine the node signature based on a plurality of message signatures determined based on voltage measurements of a plurality of CAN messages on the network, e.g. in the same way as the message signature of the measured CAN message described herein. The previous CAN messages on the network may comprise control messages which are known to be authentic. The control system may assign node signature(s) to one or nodes based on knowledge of the network.

The control system may be operable to determine the expected first and second voltage characteristics of a node signature in dependence on a plurality of message signatures of previously measured CAN messages on the network. For instance, the control system may be operable to determine the expected first voltage characteristic as an average voltage characteristic of first voltage characteristics of a plurality of earlier CAN messages. In further embodiments, the control system may be operable to determine the expected first voltage characteristic as a characteristic indicative of a statistical distribution of first voltage characteristics of a plurality of earlier CAN messages. Similarly, the control system may be operable to determine the expected second voltage characteristic as an average voltage characteristic of second voltage characteristics of a plurality of earlier CAN messages, or may as a characteristic indicative of a statistical distribution of second voltage characteristics of a plurality of earlier CAN messages.

The control system may be operable to determine the expected first and second voltage characteristics during an installation phase of the network. The expected first and second voltage characteristics may be updated, in use, e.g. upon measurement and validation of an authentic CAN message.

The node signature(s) may be stored in a memory accessible by the network, or in particular by the control system.

The message signature may comprise a third voltage characteristic indicative of a voltage difference between the CANH and CANL signals of the CAN message. The node signature may comprise a corresponding expected third voltage characteristic. In such embodiments, the control system may be operable to determine the authenticity of the CAN message in dependence on a difference between the first, second and third voltage characteristics of the message signature and the expected first, second and third voltage characteristics of the node signature.

The control system is operable to determine the authenticity of the CAN message. In embodiments, this comprises the control system comparing the message signature with the node signature, and determining the authenticity of the CAN message in dependence on a difference between the first and second voltage characteristics of the message signature and the expected first and second voltage characteristics of the node signature. In embodiments, the control system is operable to determine whether the first and/or second voltage characteristics of the message signature is/are within a threshold difference from the corresponding expected first and/or second voltage characteristics. If the first and/or second voltage characteristics are outside of the threshold difference, the control system may be operable to determine that the CAN message is inauthentic.

The difference between the first voltage characteristic and the expected first voltage characteristic, and/or the difference between the second voltage characteristic and the expected second voltage characteristic may be determined as a distance (e.g. in parameter space). For example, the method may comprise determining a Euclidean distance between the voltage characteristics of the message signature and the expected voltage characteristics of the node signature. The determined distance may be compared with a threshold, and the method may comprise determining an authenticity of the CAN message in dependence on said comparison. For example, the CAN message may be determined to be authentic in dependence on the determined distance being less than the threshold, and may be determined to be inauthentic in dependence on the determined distance being greater than the threshold.

The control system may be operable to characterise a CAN message once determined to be inauthentic. The characterisation may relate to the possible cause of the inauthentic CAN message. For example, in some embodiments the control system may be operable to compare the message signature for a particular CAN message with a plurality of node signatures, each relating to different nodes on the network. The control system may then determine the origin of the CAN message in dependence on this comparison. For instance, if the CAN message is determined to be inauthentic—e.g. lie outside of a threshold difference or distance from the expected node signature for that message—but be identified as "authentic" with respect to another node signature—e.g. lie within a threshold difference or distance for the other node signature—it may be determined that the possible cause for the inauthentic CAN message is erroneous or possibly malicious control of a node of the network. If the CAN message is determined to be inauthentic for the expected node signature, and lies outside of any threshold difference or distance for all other node signatures, it may be determined that the possible cause for the inauthentic CAN message is an inauthentic node which has been later introduced to the network—e.g. an "attacker" connecting an inauthentic ECU to the network in an attempt to gain control of the network.

The control system may use a reference node operable to provide a reference CAN message on the network. The reference node may be a "trusted" node, that is a node which is known to be authentic. The control system may be operable to determine a message signature for the reference CAN message, or indeed a node signature for the reference node in dependence on a plurality of reference CAN messages. The control system may be operable to determine message signature(s) and/or node signature(s) for other CAN messages originating from other nodes of the network relative to the message/node signature associated with the reference node. For example, the first and/or second voltage characteristics of a given message signature may comprise a relative voltage value, the relative voltage value being determined relative to the corresponding first and second voltage characteristics associated with the reference node—e.g. as part of a determined node signature for the reference node. The relative voltage characteristics may be determined as a vector, containing data indicative of the distance and direction of the message signature with respect to the message/node signature associated with the reference node. Advantageously, the subject technology may be operable to monitor drift or other changes in the voltage characteristics of the network over time.

The control system may be operable to generate and output a control signal for controlling operation of the network in dependence on the determined authenticity of the CAN message. For example, where a CAN message is deemed to be authentic the control system may simply take no action (e.g. not output a control signal), thereby allowing the network to continue to operate. Where a CAN message is deemed to be inauthentic, the control system may be operable to generate and output a control signal for preventing access for the associated node to the network. For example, the control signal may be sent on the network to the associated node to prevent further operation of the node. The control system may output a control signal for stopping operation of the network altogether. The control system may be operable to output a control signal for alerting a user/operator of the network to the inauthentic signal. For example, the control signal may be output to a visual display device, or may comprise outputting the signal to a data store/server for flagging the inauthentic CAN message in a diagnostics tool for the network, for example.

According to another aspect of the subject technology there is provided computer software comprising computer readable instructions which, when executed, perform a method in accordance with any aspect described herein.

According to a further aspect of the subject technology there is provided a computer readable medium comprising the computer software of the preceding aspect of the subject technology.

Optionally, the computer readable medium may comprise a non-transitory computer readable medium.

According to another aspect of the subject technology there is provided a network comprising a plurality of nodes and a control system according to any preceding aspect of the subject technology.

The network may comprise a controller area network. The network may comprise a CAN FD network or a CAN XL network.

According to an aspect of the subject technology there is provided a system comprising a network and/or control system of any aspect described herein.

The system may comprise or be comprised within a vehicle. The vehicle may be a motor vehicle, an aircraft, a watercraft, for example. The system may comprise a building management system. The system may comprise a management system for a manufacturing facility.

According to an aspect of the subject technology there is provided a vehicle comprising the control system, network or system according to any aspect described herein.

BRIEF DESCRIPTION OF THE FIGURES

In order that the subject technology may be more clearly understood one or more embodiments thereof will now be described, by way of example only, with reference to the accompanying drawings, of which.

DETAILED DESCRIPTION OF THE PREFERRED EMBODIMENTS

The present technology relates to a method 10 and control system 102 for monitoring operation of a network 100. As shown in the Figures, the subject technology extends to a network 100 comprising the control system 102.

Figure 1:
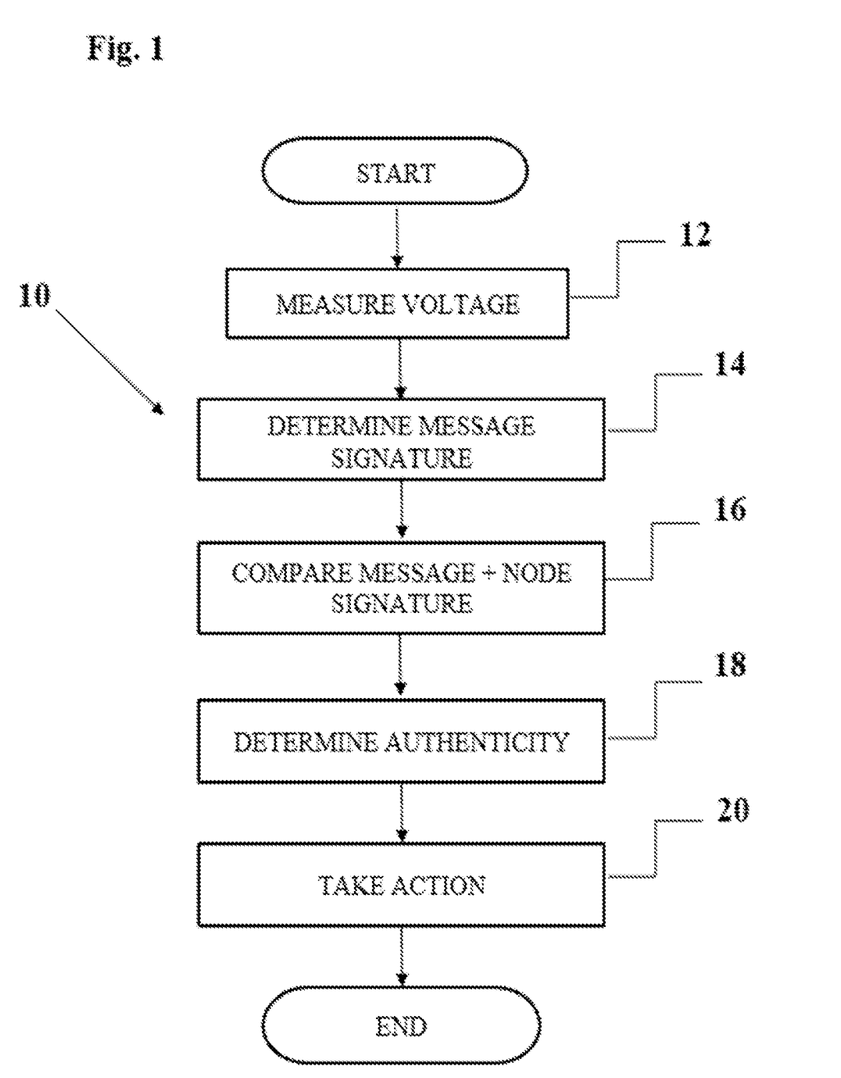
FIG. 1 is a flowchart illustrating an embodiment of a method of the subject technology.
Figure 2:
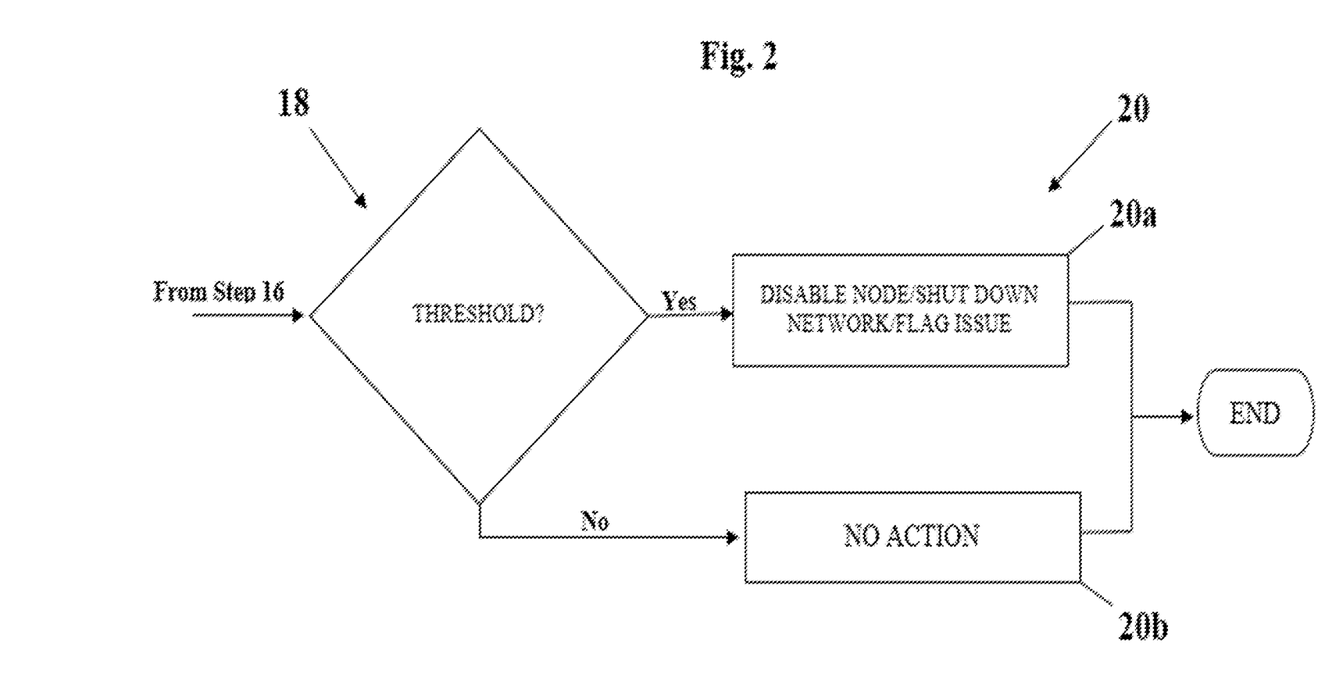
FIG. 2 is a further flowchart further illustrating the embodiment shown in FIG. 1.

FIGS. 1 and 2 illustrate an embodiment of a method 10 for monitoring operation of a network, e.g. controller area network (CAN) 100.

In general, the method 10 comprises, at step 12, measuring a voltage associated with a message transmitted on the network 100. A message signature is subsequently determined in dependence on the measured voltage (step 14). The message signature includes a voltage characteristic associated with the measured voltage. At step 16, the message signature is compared with a stored node signature. The node signature includes an expected voltage characteristic which has been determined in dependence on one or more previously measured messages on the network 100. Based on this comparison, an authenticity of the message is determined (step 18). Finally, at step 20, an appropriate action is taken depending on whether the message is determined to be authentic or not.

Figure 6:
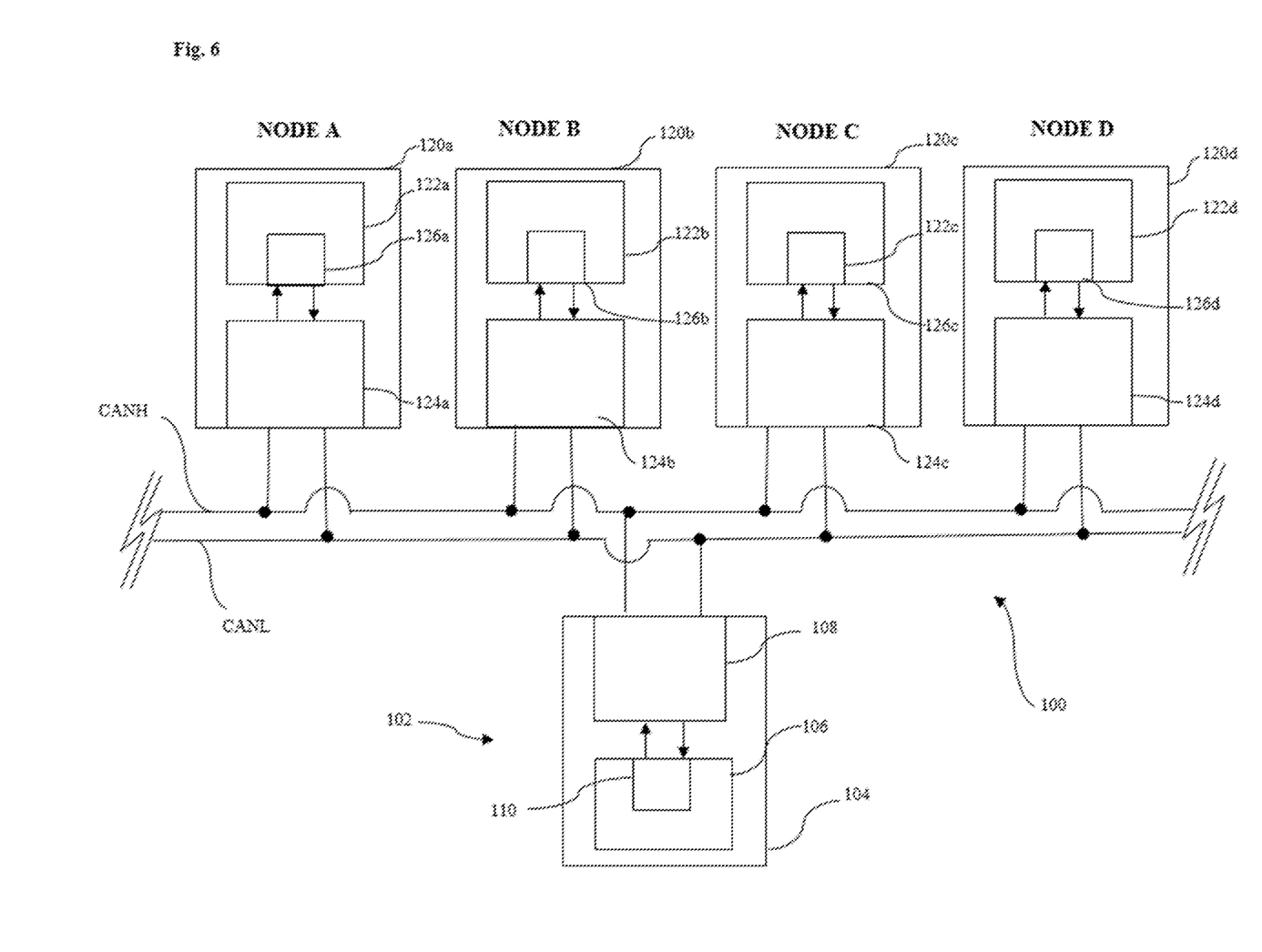
FIG. 6 is a schematic overview of an embodiment of a network forming part of the subject technology.

Here, the network 100 comprises a controller area network (CAN) 100, an example of which is shown in FIG. 6. CAN 100 comprises a series of nodes 120a, 120b, 120c, 120d each operably coupled to a pair of CAN wires, CANH and CANL, with each node 120a, 120b, 120c, 120d operable, via respective transceivers 124a, 124b, 124c, 124d to output voltage levels on the two CAN wires to form a CAN message in the form of a series of dominant (logic 0) or recessive (logic 1) bits. Typically, for a dominant bit, any given node is operable to output approximately 3.5V on the CANH wire and 1.5V on the CANL wire—a differential voltage of approximately 2.0V. For a recessive bit, any given node is operable to output approximately 2.5V on each of the CANH and CANL wires, giving a differential voltage of approximately 0V. By measuring the differential voltage of CANH and CANL, a receiver node can read a CAN message in the form of a series of logic 0 and logic 1 bits.

Figure 3:
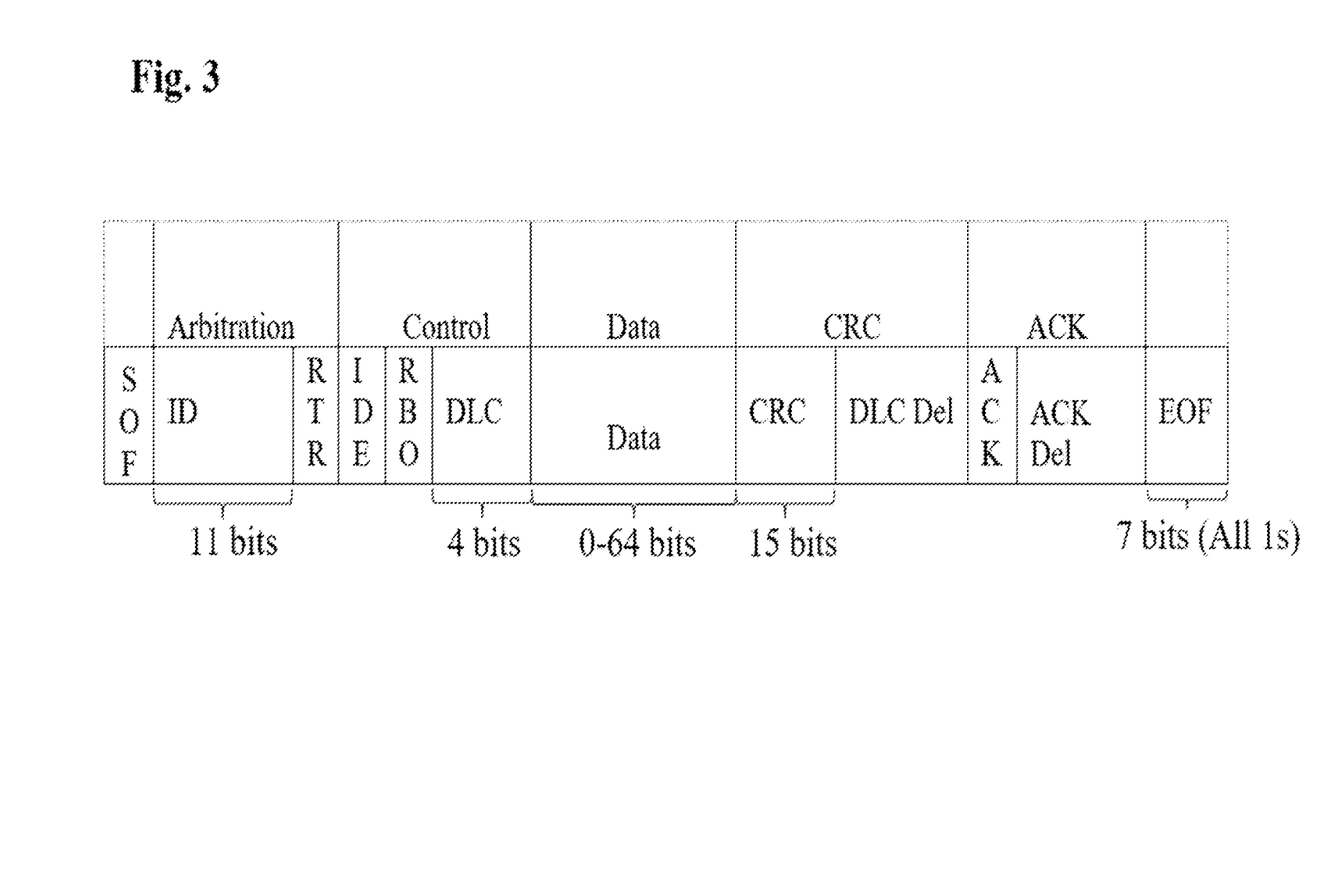
FIG. 3 is an overview of a CAN message.

A schematic overview of a CAN message is shown in FIG. 3. The CAN message begins with a "Start of Frame" (SOF) bit, and then includes a series of fields including arbitration, control, data, cyclic redundancy check and acknowledgment fields before ending with an "End of Frame" field which comprises a series of 7 recessive bits. Each field may include various sub-frames, including an ID (part of the acknowledgement frame) and a data length code (part of the control frame). The ID is specific to the content of the message and defines the priority of CAN messages on the network. For a standard format, the CAN message has an 11-bit ID, but other formats are known, including an extended format with a 29-bit ID. The DLC contains information relating to the length of the data field.

Figure 4A:
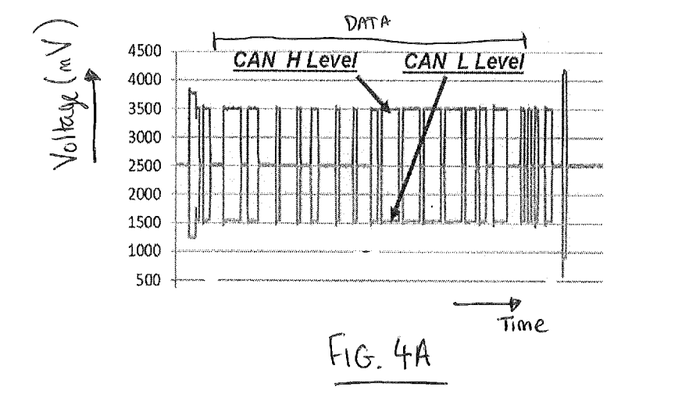
FIGS. 4A-4B are graphical illustrations of the voltage levels for both CANH and CANL signals for CAN messages on a network.
Figure 4B:
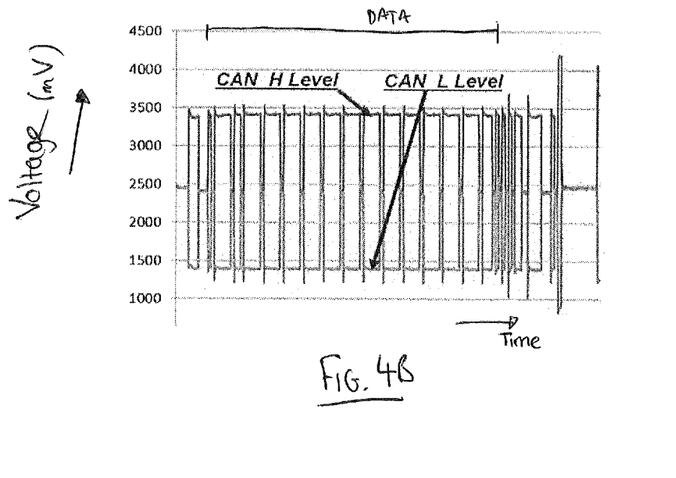

As is described in detail herein, the present technology advantageously makes use of small differences in the CANH and CANL voltage outputs for different nodes, specifically during the data field of a CAN message. Such differences are present due to the nature of the nodes themselves, the position of the nodes within the network, the length of the network itself. Accordingly, these discrepancies may be used to identify the origin of any given CAN message on the network. These differences are shown in FIGS. 4A and 4B which show CANH and CANL voltages over time for part of a CAN message, specifically focusing on the data field. As can be seen, in FIG. 4A the CANH voltage for a dominant bit during the data field of a CAN message from a first node is measured to be approximately 3500 mV, with the CANL voltage at approximately 1500 mV. For a second node (illustrated by FIG. 4B), the CANH voltage for a dominant bit during the data field is measured to be just less than 3500 mV, perhaps around 3400 mV, with the corresponding CANL value at around 1400 mV. Accordingly, the present technology realises that using this difference, the origin (i.e. which node) of any given CAN message can be determined, or it can at least be determined whether a CAN message with a given ID is authentic based on previously observed voltage values for CAN messages with that particular ID.

Access to the network 100 is resolved during arbitration in a manner known in the art, and will not be described in detail herein. However, it is important to note that during arbitration a number of nodes may be attempting to access the network, with priority given to the node having the "lowest" ID. Similarly, during acknowledgment, nodes other than the transmitting node each send a dominant (logic 0) bit on the network to acknowledge receipt of the CAN message. Again, this may result in numerous nodes accessing the network concurrently during acknowledgment. Accordingly, the voltage value on the CANH and CANL wires during arbitration and acknowledgement can vary significantly, masking any differences in the true voltage output from different nodes. This is shown in FIGS. 4A and 4B, where relatively high voltage levels are observed on the CANH wire, and relatively low voltage levels are observed on the CANL wire immediately prior to and/or after the data field. As is discussed herein, the present technology advantageously ignores the voltage characteristics of the CAN message during arbitration and acknowledgement.

Method 10 is described in detail hereinbelow, referring back to FIGS. 1 and 2.

At step 12, the method 10 comprises measuring a voltage associated with a CAN message transmitted on the network 100. Specifically, step 12 comprises measuring a voltage associated with a CANH signal and CANL signal of the CAN message transmitted on the network from a node. As is discussed herein, the voltage measurements are advantageously obtained for the data field of the CAN message, only.

This is achieved by identifying the SOF of the CAN message and using the SOF as a trigger to begin measurement of the voltages of the CANH and CANL wires. Advantageously, the method 10 includes introducing a delay after the SOF before beginning voltage measurements so as to ignore the arbitration field of the CAN message. The delay period is dependent on the speed of the network and the number of bits of the CAN message preceding the data field which may differ between CAN types A buffer is also applied to the length of the CAN message preceding the data field to account for any bit stuffing. The delay period may be determined in real time or can be predefined—the method is not limited in this sense.

In addition, the method 10 comprises measuring the voltage associated with CANH and CANL signals for a measurement time period, following the delay, which is dependent on the length of the data field of the CAN message, determined from the DLC of the CAN message and again the speed of the network. The measurement time period may be determined in real time or can be predefined—the method is not limited in this sense. Advantageously, the method 10 measures the voltages associated with CANH and CANL only during transmission of the data field, thereby mitigating any issues caused by multiple nodes attempting to access the network.

At step 14, a message signature is determined in dependence on the measured voltages. The message signature includes a first voltage characteristic corresponding to the voltage associated with the CANH signal and a second voltage characteristic corresponding to the voltage associated with CANL signal during transmission of the data field of the CAN message.

Specifically, multiple voltage measurements for both the CANH and CANL signals are measured during transmission of the data field of the CAN message. These measurements are then processed to obtain an average voltage for the CANH signal—the first voltage characteristic, and an average voltage for the CANL signal—the second voltage characteristic.

These averages are obtained only for the dominant bits of the data field of the CAN message. To differentiate between dominant and recessive bits, the method 10 includes determining a voltage difference between the CANH and CANL signals for voltage measurements obtained at the same time. This includes subtracting the CANL voltage from the CANH voltage and comparing the difference to a threshold. The voltage measurements are determined to correspond to a dominant bit where the difference between the CANH and CANL voltages is greater than the threshold. Typically, the threshold may be set at 1V. This may account for poor grounding of the network, or nodes within the network which might otherwise lead to inaccuracies if absolute voltage values were used to discriminate between dominant and recessive bits.

At step 16, the determined message signature is compared with a node signature for the node (as determined by the ID of the CAN message). The node signature includes expected first and second voltage characteristics for the CANH and CANL signals, which have been determined based on one or more previously measured CAN messages on the network which are known to be authentic, and are typically determined in the same way as the message signature of the measured CAN message as described herein. For instance, the expected first and second voltage characteristics can comprise average voltage characteristics of first and second voltage characteristics of a plurality of earlier CAN messages. In a variant, the expected first and second voltage characteristics can be indicative of a statistical distribution of first and second voltage characteristics of a plurality of earlier CAN messages. The node signatures are assigned to one or more nodes based on knowledge of the network—i.e. "Node A" has a first node signature assigned with expected first and second voltage characteristics for Node A, "Node B" has a first node signature assigned with expected first and second voltage characteristics for Node B, and so on for each of the nodes on the network. Typically, this assignment takes place during an installation phase of the network, but in an advantageous extension of the method, the expected first and second voltage characteristics for each node signature may be updated in use, e.g. upon measurement and validation of an authentic CAN message. The node signatures are stored in a memory accessible by the network.

At step 18, the method 10 comprises determining the authenticity of the CAN message. Here, this comprises comparing the message signature with the node signature, and determining the authenticity of the CAN message in dependence on a difference between the first and second voltage characteristics of the message signature and the expected first and second voltage characteristics of the node signature. Specifically, the difference between the first voltage characteristic and the expected first voltage characteristic, and the difference between the second voltage characteristic and the expected second voltage characteristic is determined as a distance in parameter space.

Figure 5:
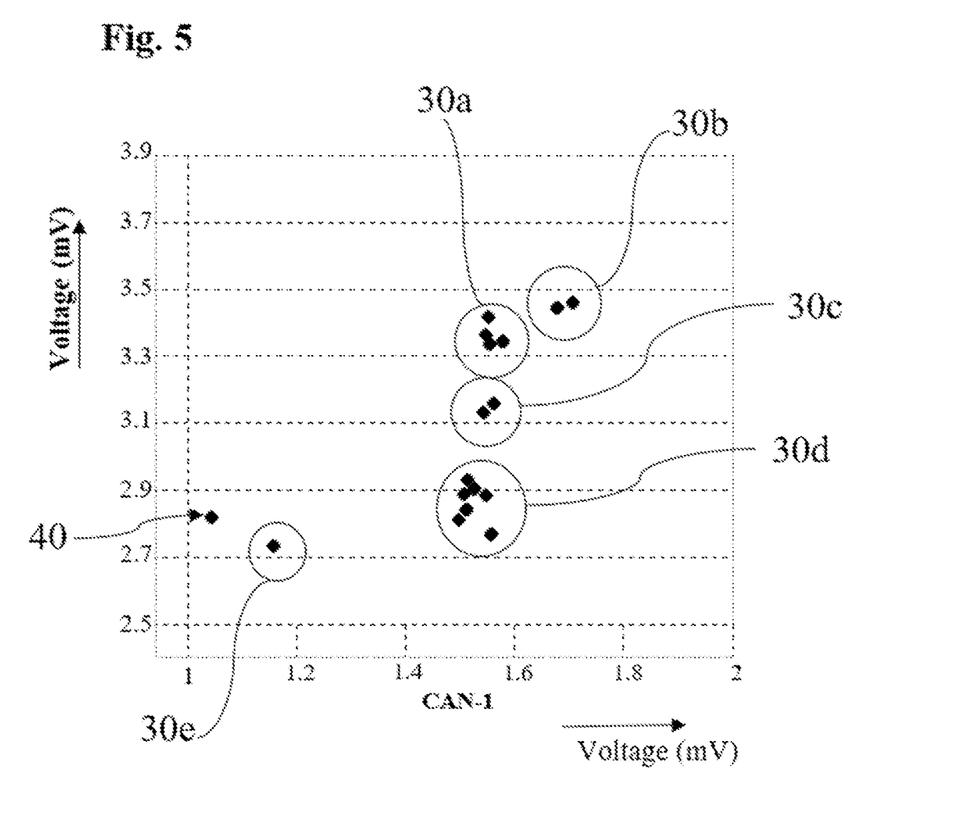
FIG. 5 is a graphical illustration of message signatures determined in accordance with the subject technology for a plurality of CAN messages on a network.

This is shown figuratively in FIG. 5 which shows a plot of CANH against CANL values for a plurality of CAN messages. Where points on this plot are grouped—e.g. groups 30a, 30b, 30c, 30d, 30e—they are determined to correspond to authentic CAN messages originating from a particular node. These groupings are then used to define the node signatures for the particular nodes, and a following message signature may then be compared with that node signature to determine its authenticity. In the illustrated embodiment, the method 10 comprises determining a Euclidean distance between the position of the voltage characteristics of the message signature and the expected voltage characteristics of the node signature corresponding to the believed origin (e.g. as determined by the ID of the CAN message). The determined distance is compared with a threshold and the authenticity of the CAN message is determined based on said comparison. Specifically, the CAN message is determined to be authentic in dependence on the determined distance being less than the threshold, and is determined to be inauthentic in dependence on the determined distance being greater than the threshold (FIG. 2).

In an example, the ID for a particular measured CAN message may suggest that the expected voltage characteristics of the message signature correspond to the node signature associated with a group 30a. However, upon determination of the voltage characteristics for the CAN message, the message signature is determined to be positioned at point 40 in FIG. 5. This may be determined to sit outside of the threshold distance from the node signature associated with group 30a and hence the CAN message is deemed to be inauthentic.

Finally, once the authenticity of the CAN message has been determined at step 18 the method moves on to step 20 where an appropriate action is taken depending on the determined authenticity of the CAN message. The subject technology is not limited in this sense, but example actions may include taking no action and allowing the network to continue to operate where a CAN message is deemed to be authentic (step 20b). Alternatively, where a CAN message is deemed to be inauthentic, the method can include preventing access for the associated node to the network, disabling the network altogether and/or alerting a user or operator of the network to the inauthentic signal (step 20a).

Figure 7:
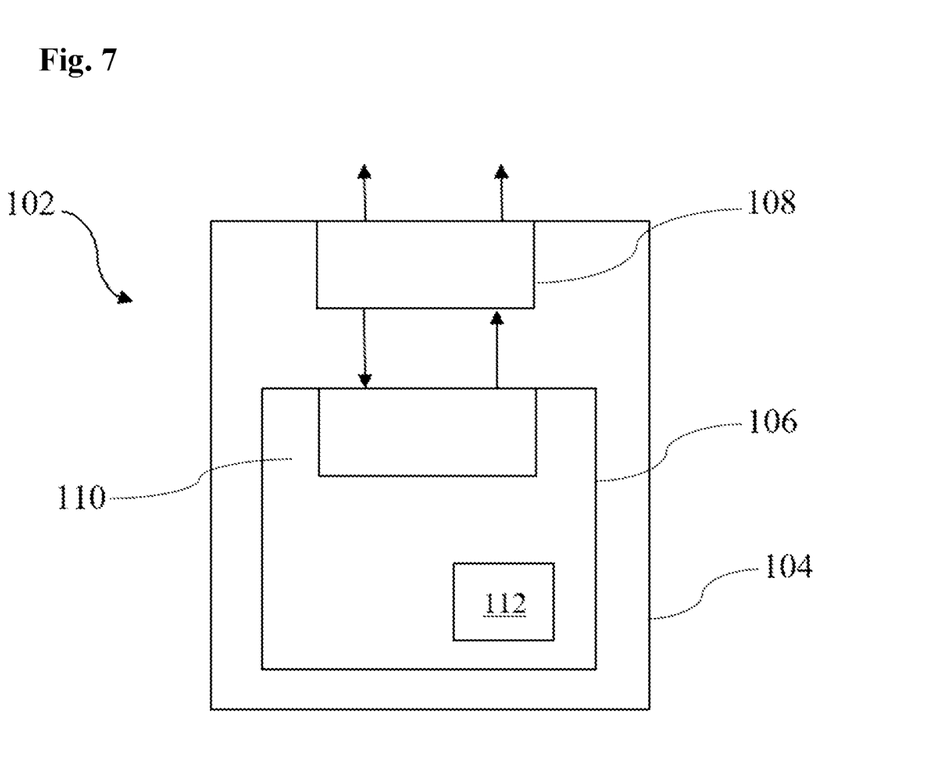
FIG. 7 is a schematic overview of an embodiment of a control system forming part of the network shown in FIG. 6.

Embodiments of a network 100 and associated control system 102 are shown schematically in FIGS. 6 and 7.

The network 100 includes a plurality of nodes 120a, 120b, 120c, 120d and a controller in the form of a monitoring node 104 operably and communicably coupled to a pair of signal wires—CANH and CANL. As discussed herein, each of the nodes 120a, 120b, 120c, 120d is configured to output voltage levels on the two CAN wires CANH and CANL to form a CAN message in the manner described herein. The nodes 120a, 120b, 120c, 120d include respective transceivers 124a, 124b, 124c, 124d for transmitting (and receiving) the signals to/from the CAN wires. In addition, each node 120a, 120b, 120c, 120d includes a respective processor 122a, 122b, 122c, 122d for controlling operation of the node 120a, 120b, 120c, 120d, and a CAN module 126a, 126b, 126c, 126d for specifically controlling the interface between the node 120a, 120b, 120c, 120d and the CAN wires CANH, CANL. As will be appreciated, the processors 122a, 122b, 122c, 122d may each be individually operable to control respective functions of a larger system—e.g. the nodes 120a, 120b, 120c, 120d may comprise ECUs on a vehicle, each operable to control different aspects of the vehicle reporting to or taking instruction from the CAN bus.

In the illustrated embodiment, the control system 102 comprises the monitoring node 104 which is configured similarly to nodes 120a, 120b, 120c, 120d on the network. The monitoring node 104 includes an electronic processor 106. The processor 106 is operably coupled to a CAN transceiver 108 for receiving input signals from the CAN bus indicative of the voltage level on the CANH and CANL wires of the bus. The monitoring node 104 includes an electronic memory device 112 electrically coupled to the processor 106 and includes instructions stored therein. The instructions may relate to operating instructions for the monitoring node 104. The memory device 112 can include one or more node signatures stored therein and is accessible by the processor 106 of the monitoring node 104, in use. The processor 106 is configured to access the memory device 112 and execute the instructions in order to perform the method 10 described herein and discussed further below.

Specifically, the monitoring node 104 is configured to receive input signals from the CANH and CANL wires indicative of a voltage associated with a CAN message transmitted on the network 100. The processor 106 is configured to use these voltage measurements to determine a message signature in the manner described herein, i.e. as per step 14 of method 10. Specifically, the processor 106 is able to extract the voltage measurements from the input signal and generate first and second voltage characteristics for the CAN message to form the message signature. The processor may then compare the message signature with a node signature stored in the memory device 112 and based on this comparison, determine an authenticity of the CAN message. The control system 102 is configured to take an appropriate action based on whether the message is determined to be authentic or not. This may take any one of a number of forms, and the subject technology is not limited in this sense. However, in an example embodiment, the monitoring node 104 may be operable, via transceiver 108, to send a further CAN message on the network 100 to control operation of a node 120a, 120b, 120c, 120d on the network, e.g. a node determined to have transmitted an inauthentic message, to prevent access to the network 100 for that particular node. In a further example, the monitoring node 104 may be operable to shut down the network 100 altogether. In yet a further example, the monitoring node 104 may be operable to control output of an alert to a user of the network 100 informing said user of the determination of the inauthentic message on the network 100. The control system 102 can include an output, e.g. an electronic output for outputting a control signal independent of the network 100, e.g. a separate wired or wireless connection with a further control unit.

The one or more embodiments are described above by way of example only. Many variations are possible without departing from the scope of protection afforded by the appended claims.

The invention claimed is:

1. A method for monitoring operation of a controller area network (CAN) comprising a plurality of nodes, the method comprising:
   measuring a voltage associated with a CAN High (CANH) signal and a CAN Low (CANL) signal of a CAN message transmitted on the network from a node, the CAN message comprising a start-of-frame (SOF) field, then an arbitration field comprising an ID for the CAN message, then a data field, then an acknowledgement field, and then an end of frame field, wherein the measurements are obtained only from the data field of the CAN message;
   determining a message signature in dependence on the measured voltages, the message signature comprising a first voltage characteristic corresponding to the voltage associated with the CANH signal and a second voltage characteristic corresponding to the voltage associated with CANL signal during transmission of the data field of the CAN message;
   comparing the message signature with a node signature for the node, the node signature comprising expected first and second voltage characteristics for the CANH and CANL signals, respectively, the expected first and second voltage characteristics being determined in dependence on one or more previously measured CAN messages on the network; and
   determining the authenticity of the CAN message in dependence on a difference between the first and second voltage characteristics of the message signature and the expected first and second voltage characteristics of the node signature.

2. The method as claimed in claim 1, comprising measuring the voltage associated with CANH and CANL signals for a measurement time period.

3. The method as claimed in claim 2, wherein the measurement time period is dependent on one or more of: the length of the data field of the CAN message; a speed of the network; and a data length code (DLC) of the CAN message.

4. The method as claimed in claim 1, comprising identifying the SOF field of the CAN message, and using the SOF field to trigger the measurement of the voltage associated with the CANH and CANL signals of the CAN message.

5. The method as claimed in claim 1, comprising delaying measurement of the CANH and CANL voltage for a delay period.

6. The method as claimed in claim 5, wherein the delay period is dependent on one or more of: the speed of the network; a length of the CAN message preceding the data field; and a buffer.

7. The method as claimed in claim 1, comprising obtaining multiple voltage measurements for both the CANH and CANL signals, wherein the first voltage characteristic comprises an average voltage for the CANH signal and the second voltage characteristic comprises an average voltage for the CANL signal.

8. The method as claimed in claim 1, comprising determining whether each of the voltage measurements corresponds to a dominant or recessive bit.

9. The method as claimed in claim 8, comprising determining a voltage difference between the CANH and CANL signals for voltage measurements obtained at the same time, and comparing the voltage difference to a threshold.

10. The method as claimed in claim 8, comprising discarding voltage measurements corresponding to recessive bits.

11. The method as claimed in claim 10, wherein the first voltage characteristic comprises an average voltage associated with a plurality of dominant bits of the CANH signal, and the second voltage characteristic comprises an average voltage associated with a plurality of dominant bits of the CANL signal.

12. The method as claimed in claim 1, wherein the expected first and second voltage characteristics of the node signature are determined in dependence on one or more previously measured control CAN messages on the network.

13. The method as claimed in claim 1, wherein the message signature comprises a third voltage characteristic indicative of a voltage difference between the CANH and CANL signals of the CAN message, and the method comprises determining the authenticity of the CAN message in dependence on a difference between the first, second and third voltage characteristics of the message signature and the expected first, second and third voltage characteristics of the node signature.

14. The method as claimed in claim 1, comprising determining whether the first and/or second voltage characteristics of the message signature is/are within a threshold difference from the corresponding expected first and/or second voltage characteristics, and determining the authenticity of the CAN message in dependence thereon.

15. The method as claimed in claim 14, wherein the difference between the first voltage characteristic and the expected first voltage characteristic, and/or the difference between the second voltage characteristic and the expected second voltage characteristic is determined as a distance.

16. The method as claimed in claim 15, wherein the distance comprises a Euclidean distance between the voltage characteristics of the message signature and the expected voltage characteristics of the node signature.

17. The method as claimed in claim 15, comprising comparing the determined distance with a threshold, and determining an authenticity of the CAN message in dependence on said comparison, wherein the CAN message is determined to be authentic in dependence on the determined distance being less than the threshold, and is determined to be inauthentic in dependence on the determined distance being greater than the threshold.

18. The method as claimed in claim 1, comprising using a reference node operable to provide a reference CAN message on the network.

19. The method as claimed in claim 18, wherein the first and/or second voltage characteristics of the message signature comprise a relative voltage value, the relative voltage value being determined relative to corresponding first and second voltage characteristics associated with the reference node.

20. The method as claimed in claim 1, comprising controlling operation of the network in dependence on the determined authenticity of the CAN message.

21. The method as claimed in claim 20, comprising preventing access for the node to the network, stopping operation of the network altogether, and/or alerting a user or operator of the network to the inauthentic signal in dependence on the determination of an inauthentic CAN message.

22. A control system for monitoring operation of a controller area network, the control system comprising one or more controllers, and being configured to:
    receive an input signal indicative of a measured voltage associated with a CANH signal and CANL signal of a CAN message transmitted on the network from a node, the CAN message comprising a start-of-frame (SOF) field, then an arbitration field comprising an ID for the CAN message, then a data field, then an acknowledgement field, and then an end of frame field, wherein the measurements are obtained only from the data field of the CAN message;
    determine a message signature in dependence on the measured voltages, the message signature comprising a first voltage characteristic corresponding to the voltage associated with the CANH signal and a second voltage characteristic corresponding to the voltage associated with CANL signal during transmission of the data field of the CAN message;
    compare the message signature with a node signature for the node, the node signature comprising expected first and second voltage characteristics for the CANH and CANL signals, respectively, the expected first and second voltage characteristics being determined in dependence on one or more previously measured CAN messages on the network; and
    determine the authenticity of the CAN message in dependence on a difference between the first and second voltage characteristics of the message signature and the expected first and second voltage characteristics of the node signature.

23. The control system according to claim 22, further comprising a network comprising a plurality of nodes.

24. The control system according to claim 22, wherein the control system is on a vehicle.

25. A method for monitoring operation of a controller area network (CAN) comprising a plurality of nodes, the method comprising:
    measuring a voltage associated with a CAN High (CANH) signal and a CAN Low (CANL) signal of a CAN message transmitted on the network from a node, the CAN message comprising a start-of-frame (SOF) field, then an arbitration field comprising an ID for the CAN message, then a data field, then an acknowledgement field, and then an end of frame field, wherein the measurements are obtained only from the data field of the CAN message, only;
    determining a message signature in dependence on the measured voltages, the message signature comprising a first voltage characteristic corresponding to the voltage associated with the CANH signal and a second voltage characteristic corresponding to the voltage associated with CANL signal during transmission of the data field of the CAN message;
    comparing the message signature with a node signature for the node, the node signature comprising expected first and second voltage characteristics for the CANH and CANL signals, respectively, the expected first and second voltage characteristics being determined in dependence on one or more previously measured CAN messages on the network; and
    determining the authenticity of the CAN message in dependence on a difference between the first and second voltage characteristics of the message signature and the expected first and second voltage characteristics of the node signature,
    wherein the method comprises delaying measurement of the CANH and CANL voltage for a delay period and measuring the voltage associated with CANH and CANL signals for a measurement time period such that measurements are only obtained from the data field of the CAN message.

\* \* \* \* \*